United States Patent [19]

Steere, Jr.

[11] Patent Number: 5,351,444
[45] Date of Patent: Oct. 4, 1994

[54] BLADE TRACK CONTROL SYSTEM
[75] Inventor: Robert E. Steere, Jr., Boonton, N.J.
[73] Assignee: Silicon Technology Corporation, Oakland, N.J.
[21] Appl. No.: 951,393
[22] Filed: Sep. 25, 1992
[51] Int. Cl.[5] ............................................. B24B 7/00
[52] U.S. Cl. ................... 451/69; 125/13.02
[58] Field of Search ............ 51/5 C, 325; 125/13.02; 83/72, 171

[56] References Cited

U.S. PATENT DOCUMENTS

| | | | |
|---|---|---|---|
| 3,916,576 | 11/1975 | Blackburn et al. | 51/165.74 |
| 4,502,459 | 3/1985 | Dyer | 51/267 |
| 4,837,983 | 6/1989 | Fuller, Jr. | 51/165.74 |
| 4,971,021 | 11/1990 | Kubotera et al. | 125/13.01 |
| 5,025,593 | 6/1991 | Kawaguchi et al. | 125/13.02 |
| 5,074,276 | 12/1991 | Katayama | 125/13.02 |
| 5,174,270 | 12/1992 | Katayama et al. | 125/13.02 |

Primary Examiner—M. Rachuba
Attorney, Agent, or Firm—Francis C. Hand

[57] ABSTRACT

The blade track control system employs a pair of bearing pads and a pair of sensors. Each bearing pad is provided with a supply of compressed air of constant pressure to provide an aerodynamic bearing surface film against a rotating saw blade. Each bearing pad is mounted on a structure, a portion of which may be flexed in order to deflect the saw blade from a datum plane into a cutting plane. Each sensor detects a deviation in the saw blade from the cutting plane and emits a signal which effects a movement of the bearing pad toward or away from the blade in order to effect a corresponding deflection of the saw blade back to the cutting plane. The two bearing pads are mounted independently of the sensors and each is moved relative to the saw blade by deflecting a cross bar on which the bearing pad is mounted in cantilevered fashion.

21 Claims, 4 Drawing Sheets

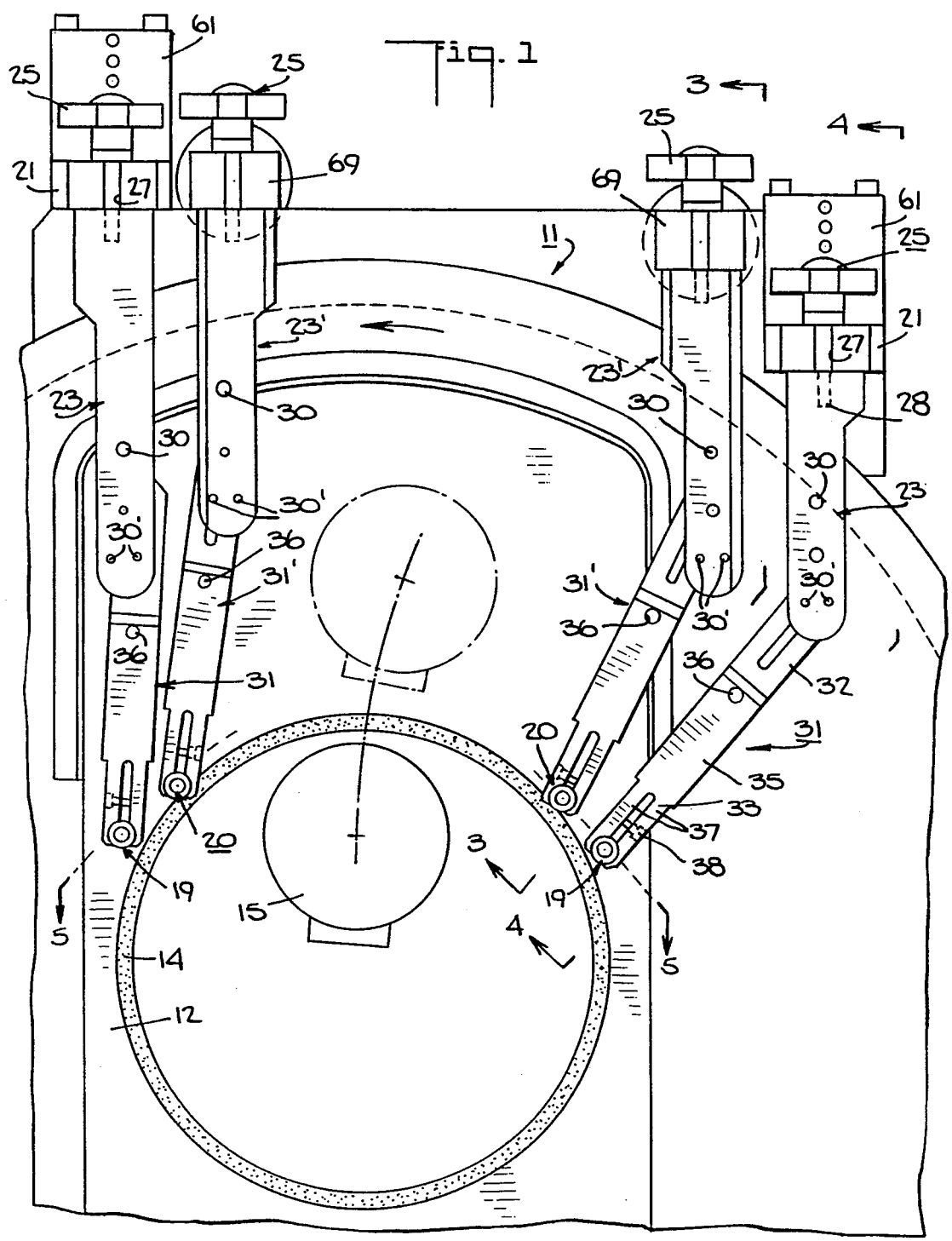

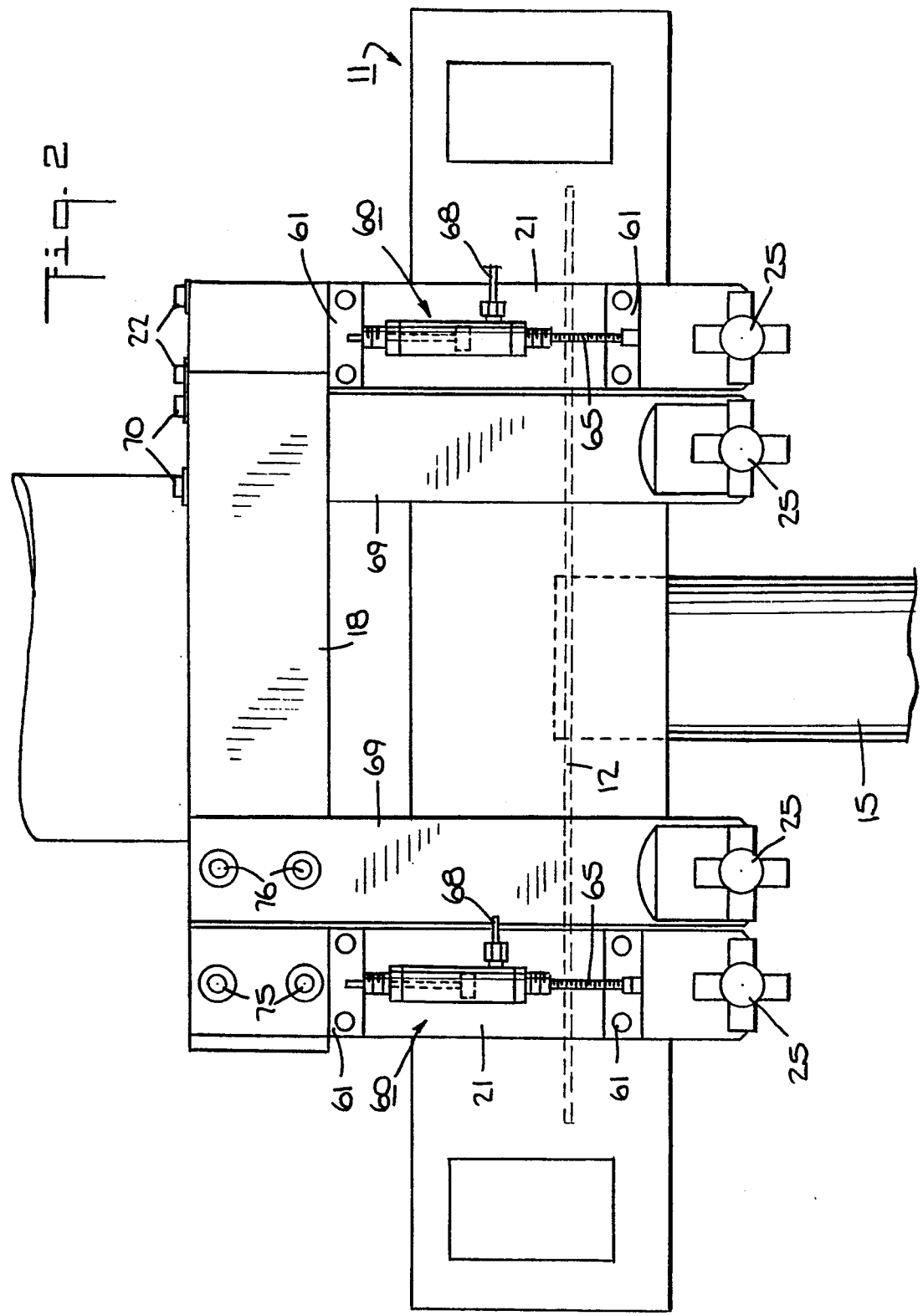

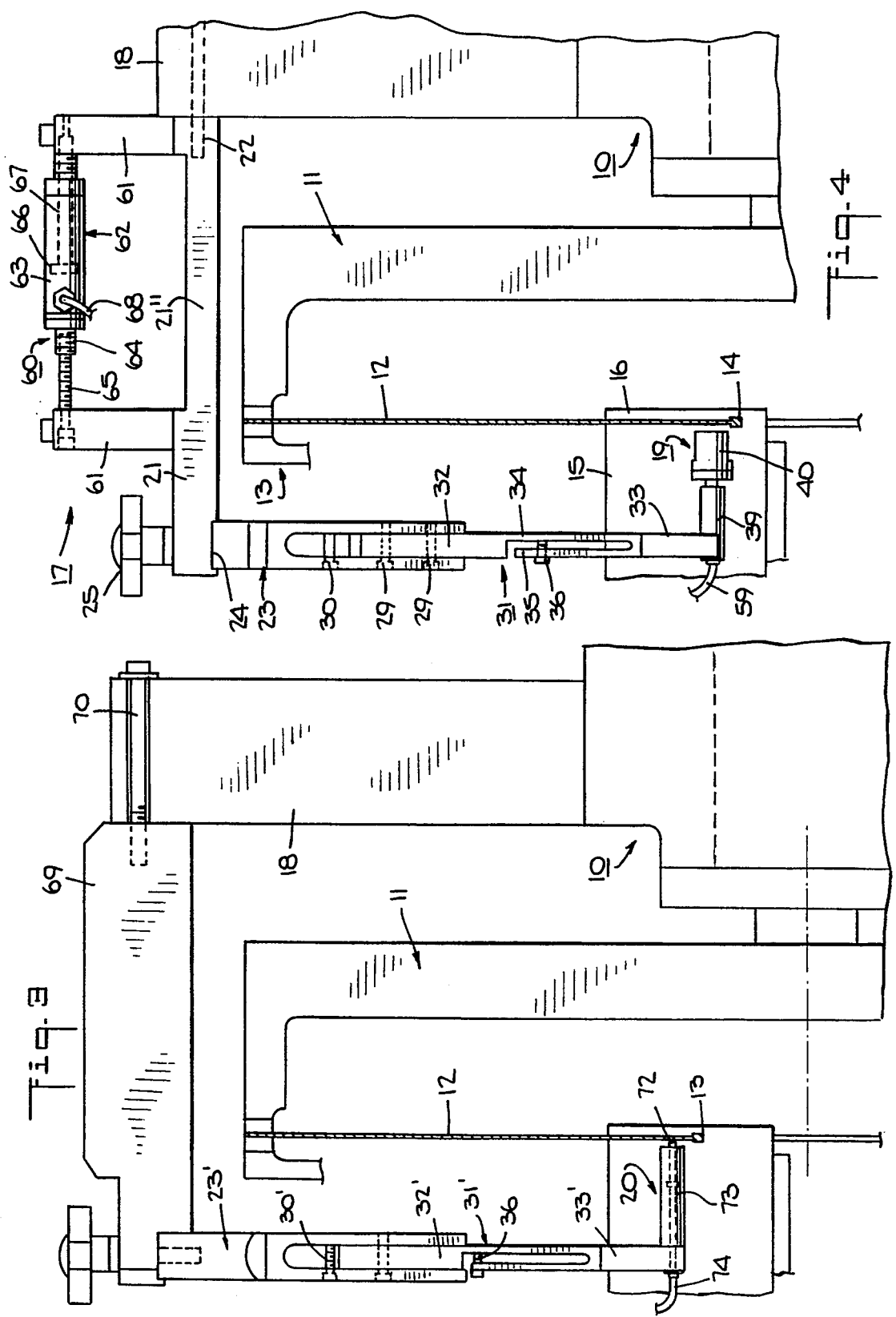

BLADE TRACK CONTROL SYSTEM

This invention relates to a blade track control system. More particularly, this invention relates to a blade track control system for an internal diameter saw blade.

As is known, various types of saws have been constructed for the cutting of wafers from ingots, for example, ingots made of silicon. Examples of such saws are described in U.S. Pat. No. 5,111,622. Generally, the cut wafers are processed so as to be utilized in the semiconductor industry for the making of silicon wafers for circuitry.

One of the problems associated with the cutting of wafers from an ingot is the need to obtain a perfectly flat wafer, that is, a wafer having a flat front side and a flat back side without any warp in the thickness of the wafer. In the past, various techniques have been known as utilized in attempts to achieve these results. For example, in the case of internal diameter (ID) saw blades, it has been known to provide various controls for maintaining the saw blade in a true cutting plane in order to obtain a uniform thickness of wafer while cutting the wafer perfectly flat. In many cases, the controls have been used to control the path of the blade indirectly by controlling the structure that supports the blade, for example as described in U.S. Pat. No. 4,974,578 and U.S. patent application Ser. No. 07/669,034 filed Mar. 14, 1991.

It has also been known to use a system to control the plane of the blade during cutting. For example, such a system has utilized a pair of rigidly mounted circular air nozzles, the faces of which are positioned close to the blade as well as a pair of sensors mounted next to each respective air nozzle. As is known, the method of using pressurized air flowing through a nozzle, thereby deflecting a blade and detecting this displacement by a sensor, is described in U.S. Pat. No. 4,502,459. The known system using this known method to operate and control the plane of the blade is to preload and control the position of the blade by increasing or decreasing the volume of air fed to the air nozzles depending upon the amount of deviation sensed by the sensors of the blade from a cutting plane. However, there are several disadvantages in such a system. For example, such a system requires a large consumption of compressed air. Further, the high volume of air from the air nozzles may dry the blade, thus, requiring special addition of extra coolant to the air curtain formed by the air nozzles. In this respect, coolant is generally applied to the saw blade during cutting in order to reduce the heat which is generated during a cutting operation. In turn, this coolant is spread by centrifugal force to cover both sides of the blade uniformly as a thin surface film. The high volume of air supplied tends to blow away the thin coolant film on the blade, disturbing the cut. Thus, additional coolant must be mixed carefully with the air supplied to the air nozzles to properly restore the coolant film on the blade. Further, a relatively heavy structure has been required to support each combination of non-independently mounted blade sensor and air nozzle. Otherwise the air nozzle pressure could deflect the support structure as well as the blade thereby giving a false indication of blade deviation.

Accordingly, it is an object of the invention to provide a blade track control system of relatively simple construction.

It is another object of the invention to be able to readily control the tendency of a ID saw blade to deviate from a true cutting plane during cutting of an ingot.

It is another object of the invention to provide a pneumatic blade track control system which requires a minimal amount of compressed air to operate.

It is another object of the invention to be able to retro-fit an existing ID saw blade with a blade track control system which requires minimal equipment.

It is another object of the invention to provide an air bearing pad configuration as an improved alternate to an air nozzle for correcting deviations in an ID saw blade during cutting of an ingot.

Briefly, the invention provides a blade track control system for an ID saw blade which comprises a pair of pneumatic bearing pads, a pair of sensors and means connected to and between each respective sensor and each respective bearing pad to adjust the position of a respective bearing pad relative to a datum plane of a saw blade.

In accordance with the invention, each bearing pad is disposed in facing relation to an ID saw blade mounted on a given datum plane and is supplied with pressurized air of constant pressure to provide an aerodynamic bearing surface film between the pad and the blade. In addition, each bearing pad is mounted so as to be movable relative to the datum plane in order to deflect the blade from the datum plane into a cutting plane during cutting of an ingot.

Each sensor is disposed in spaced facing relation to the blade for sensing a deviation of the blade from the cutting plane during a cutting operation. Further, each sensor is disposed adjacent to a respective bearing pad and is fixedly mounted relative to the datum plane.

The means connected between each sensor and respective bearing pad serves to receive a signal from the sensor indicative of a deviation of the blade from the cutting plane during cutting of the ingot and to effect an adjustment of the position of the bearing pad relative to the datum plane in response to the signal. A minimal amount of compressed air is required to operate the air bearing pads. For example, the air pressure feeding the air bearing pads can be maintained constant at 30 psig. At this pressure, each air bearing pad consumed 0.50 SCFM standard cubic feet per minute air volume approximately. This rate is achieved by exhausting the air through four 0.020" diameter orifices in the pad body to the bearing face. The bearing face in this case being 1.20" in diameter approximately.

In one embodiment, the means connected between a respective sensor and bearing pad includes a support which is fixedly mounted on a main frame of a saw blade assembly, a cross bar secured to and extending from the support and having a bearing pad mounted thereon in cantilevered manner and means for deflecting the cross bar relative to the support in order to move the bearing pad relative to the blade. For example, where the saw blade is mounted in a vertical plane in a rotatable wheelhead assembly, the cross bar may extend transversely over the wheelhead assembly while the bearing pad is mounted in dependent manner from one end of the cross bar. Thus, upon deflection of the cross bar relative to the support, the bearing pad can be moved horizontally relative to the datum plane of the saw blade.

Each bearing pad may be constructed of a holder which is mounted in relatively fixed relation to the datum plane (except when being moved during a control phase) and a bearing pad head which is mounted on the holder for pivoting thereon with two degrees of freedom relative to the saw blade. In this way, the bearing pad is swivelly mounted and can be brought to bear directly on the surface of the blade. The bearing pad head may also be provided with a plurality of outlets disposed in a circumferential array for blowing a plurality of jets of air against the saw blade to provide an aerodynamic bearing surface film. The bearing pad body is beveled 0.002–0.004 inches at a 2° angle around the bearing edge to ride over the thin coolant film in an aqua-planning manner. Still further, the bearing pad may include means for resiliently mounting the bearing pad head on the holder for rectilinear motion relative to the holder and the saw blade so as to provide a third degree of freedom of the bearing pad head relative to the saw blade.

The blade track control system serves to control the path of the ID saw blade directly. In this respect, the bearing pads do not actually touch the saw blade. Technically, the bearing pads are a combination of a hydrodynamic liquid bearing and gas bearing. Each pad rides on a film of process liquid and air. In this respect, the liquid is coolant which is applied to the blade for cutting purposes.

Generally, at the start of the wafer cutting cycle, the bearing pads are deflected toward the blade from a "home" position such that the blade is preloaded or prepositioned with a displacement of up to 25 microns from its free position in a given datum plane. The deflected blade is thus positioned in a cutting plane. The bearing pads are fully clear and do not touch, preload, or displace the blade from the datum when in the "home position". The amount of bearing pad movement to do this is relatively small and well within the elastic limit of the deflecting cross bar. The prepositioning is in the direction away from the ingot.

The path of the blade will thereafter be maintained true to the datum cutting plane throughout a cut. In other words, as the blade cuts through the ingot, any tendency to deviate from the cutting plane will be corrected. If the blade tends to move or drift in a direction away from the ingot, a sensor emits a corresponding signal, for example, to a controller which in turn serves to effect deflection of the cross bar and thus the bearing pad so that the bearing pad moves back putting less pressure on the blade and allowing the preloaded blade to counter the tendency to drift away from the ingot. The reverse occurs if the blade tends to drift away toward the ingot.

The bearing pads on either side of the ingot are controlled independently of each other. This takes into account the fact that the plane of the blade can skew laterally across the face of the ingot during a cut.

These and other objects and advantages of the invention become more apparent from the following detailed description taken in conjunction with the accompanying drawings wherein:

FIG. 1 illustrates a front view of a blade track control system mounted on an ID saw blade assembly in accordance with the invention;

FIG. 2 illustrates a plan view of the blade track control system of FIG. 1;

FIG. 3 illustrates a part side view of the mounting of a sensor in accordance with the invention;

FIG. 4 illustrates a part side view of the mounting of a bearing pad in accordance with the invention.

Figure 5:
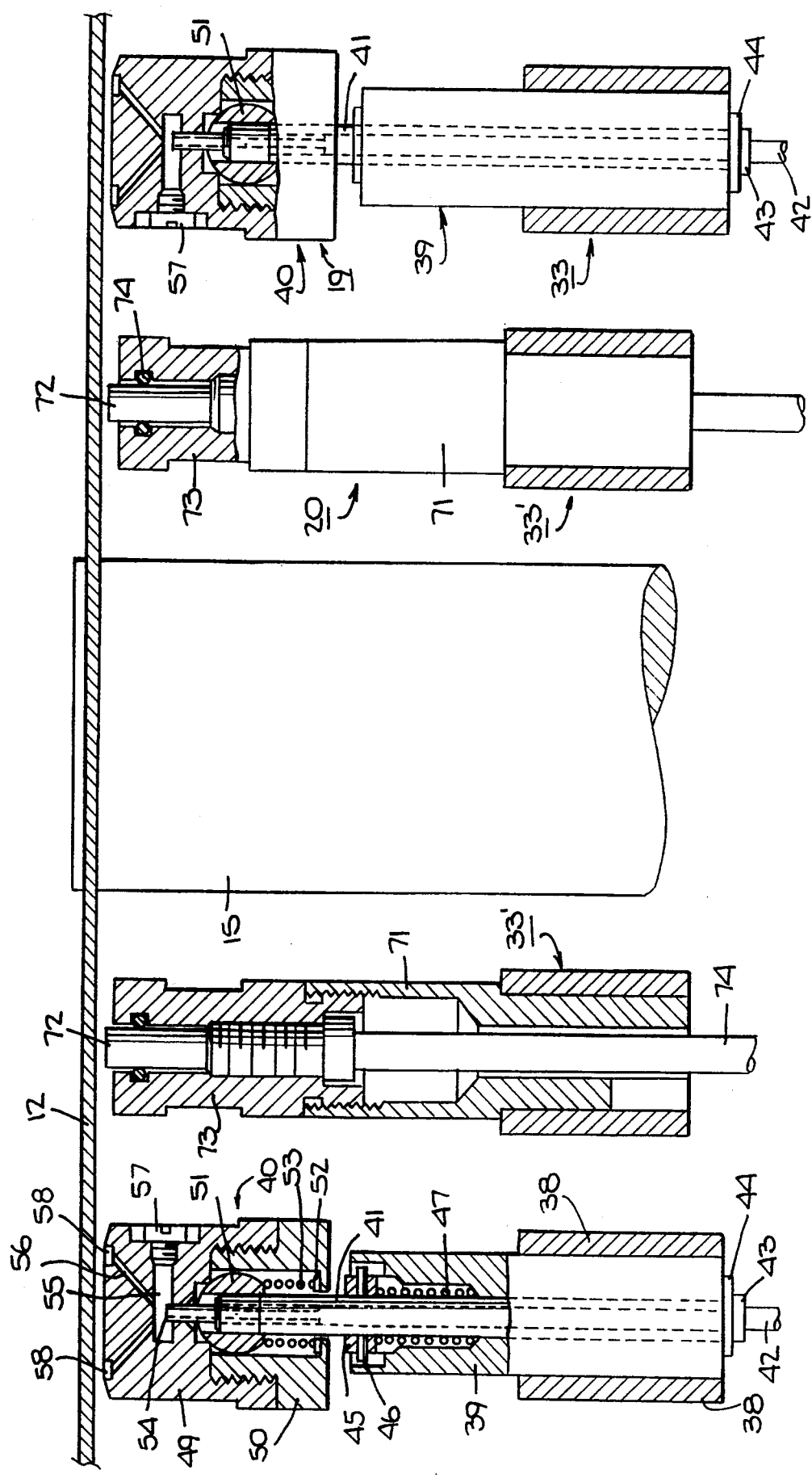
FIG. 5 illustrates a cross-sectional view of the bearing pads and sensors relative to a saw blade and ingot during a cutting operation in accordance with the invention.

Referring to FIGS. 1 and 4, the saw blade assembly includes a main frame 10 on which a wheelhead assembly 11 of conventional structure is rotatably mounted. As indicated, the wheelhead assembly is rotatable in a counter clockwise direction and has an ID saw blade 12 secured therein by means of a suitable blade mount 13. The saw blade 12 includes a cutting edge 14, for example, a diamond cutting edge and is sized to cut an ingot 15, that is, to cut a wafer 16 from the ingot 15 (see FIG. 4).

As indicated in FIG. 4, the saw blade assembly is provided with a blade track control system 17 for controlling the position of the cutting blade 12 during a cutting operation. This control system 17 includes a main support 18 fixed to the main frame 10 in any suitable fashion. In addition, as indicated in FIG. 1, the control system 17 includes a pair of pneumatic bearing pads 19 which are mounted on the support 17 in spaced facing relation to the saw blade 12 for applying a bearing force onto the blade 12 in order to deflect the blade 12 from a given datum plane into a cutting plane during cutting of the ingot 15. In addition, a pair of sensors 20 are also mounted on the support 18 in facing relation to the saw blade 12 for sensing and emitting a signal in response to a deviation of the blade 12 from the cutting plane. As indicated in FIG. 1, each sensor 20 is mounted adjacent a respective bearing pad 19 between the bearing pad 19 and the ingot 15.

The control system 17 also includes means between each sensor 20 and respective bearing pad 19 for moving a respective bearing pad 19 relative to the datum plane in response to a signal from a respective sensor 20 in order to maintain the blade 12 in the cutting plane. Referring to FIG. 4, this means includes a cross bar 21 which is secured to the support 18 via a pair of bolts 22 and which extends from the support 18, for example, horizontally in cantilevered manner. The cross bar 21 also has a reduced section 21" for flexing as described below. In addition, an arm 23 is secured to the free end of the cross bar 21 and depends therefrom in cantilevered manner in parallel to the saw blade 12. As indicated, the cross bar 21 extends transversely over the wheelhead assembly 11 so that the arm 23 depends in front of the saw blade 12 on the ingot side.

The cross bar 21 may be provided with a small recess 24 at the free end to receive the arm 23 therein. In addition, an adjustable locking means 25 is mounted on the end of the cross bar 21 in order to lock the arm 23 thereon. This adjustable locking means 25 may be in the form of a hand knob assembly having a threaded shank 26 (see FIG. 1) which passes through a slot 27 in the front of the cross bar 21 into threaded engagement with a threaded bore 28 in the arm 23 in order to clamp the arm 23 to the cross bar 21. Of note, each slot 27 is sized to allow quick removal of the arm 23 when changing blades for example.

As indicated in FIG. 4, the arm 23 is slotted at the lower end to form a pair of depending fingers 29. In addition, retaining screws 30 and 30' pass through one finger 29 into threaded engagement with the other finger 29 so as to effect a clamping action between the fingers 29. In this respect, the means for mounting a bearing pad 19 also includes a clamp 31 which is secured between the fingers 29. The clamp 31 has a head portion 32 secured between the gripping fingers 29 of the depending arm 23, an end portion 33 for receiving a bearing pad 19 therein and a reduced portion 34 connecting the head portion 32 and the end portion 33. In addition, the clamp 31 has a flexible portion 35 extending from the end portion 33 in parallel to the reduced portion 34. An adjusting screw 36 passes through the flexible portion 35 into threaded engagement with the reduced portion 34 so as to effect deflection of the end portion 33 relative to a datum plane of the saw blade 12. That is, by bringing the flexible portion 36 closer to the reduced portion 34, the depending end portion 33 pivots in a counter-clockwise direction as viewed in FIG. 4 away from the blade 12. Threading of the screw 36 in a manner so as to move the flexible portion 36 in a counter-clockwise manner moves the end portion 33 and thus the bearing pad 19 closer to the saw blade 12.

As indicated in FIG. 1, the end portion 33 of the clamp 31 is bifurcated to have two legs 37 each of which is provided to accept a clamp screw 38 which passes through the one leg into threaded engagement with the other leg. Only one clamp screw 38 is installed from the side most convenient in order to clamp the bearing pad 19 to the clamp 31.

Referring to FIG. 5, each bearing pad 19 includes a holder 39 which is mounted in relatively fixed relation to the datum plane of the saw blade 12 (except when moving to control the blade) via the end portion 33 of a clamp 31. In addition, each bearing pad 19 has a bearing head 40 mounted on the holder 39 for pivoting thereon with two degrees of freedom relative to the saw blade 12.

As shown, the holder 39 is in the form of a cylindrical bushing or the like through which a hollow air tube 41 passes. In addition, a barb fitting 42 provided with a male threaded portion and a hex drive portion 43 is fitted coaxially within the air tube 41 which is provided with a matching female threaded portion. A washer 44 is placed on the thread of the barb fitting 42 and tightened in place against the end of the tube 41. This shoulders the rectilinear movement of the tube 41 as the tube 41 is biased to the right by spring pressure. At the opposite end, the holder 39 is recessed so as to the receive a ring 45 through which a dowel pin 46 passes. The pin 46 also passes through a suitable bore in the air tube 41. A spring 47 is provided between the ring 45 and an inner wall portion of the holder 39 so as to bias the air tube 41 in a direction out of the holder 39, that is to the right as shown in FIG. 5. The purpose of spring 47 is to provide relief in case the air pad 19 is pushed too hard against the blade 12. The spring force is shouldered by the washer 44 (see above). The air tube 41 is thus mounted in a resilient manner within the holder 39 so as to move in a rectilinear direction when pushed to the left. In this way, the bearing head 40 is able to move in a rectilinear manner with one degree of freedom relative to the saw blade 12.

The bearing head 40 includes a bearing pad body 49 and a bearing retainer bushing 50 which are threaded together. In addition, a means in the form of a seating ball 51 is mounted on the end of the air tube 41 so as to pivotally mount the bearing head 40 relative to the holder 39 with two degrees of freedom relative to the saw blade 12. In this respect, a washer 52 is disposed within a recess of the retainer bushing 50 and a spring 53 is disposed between the ball 51 and the washer 52 so as to maintain the bearing pad body 49 in seated relation on the ball 51.

The bearing pad body 49 also has a plastic tube 54 which is coaxially mounted within the end of the air tube 41 so as to conduct a flow of air without leakage therethrough into a chamber 55 within the bearing pad body 49. As indicated, a plurality of relatively small (0.020″ diameter) bores 56 extend from the chamber 55 to respective outlets 58 so as to conduct flows of air to provide an aerodynamic bearing surface film thereto. These outlets 58 are disposed in a circumferential array, for example, four such outlets 58 are incorporated so as to direct jets of air to provide an aerodynamic bearing surface film against the saw blade 12. A suitable plug 57 is also threaded into the bearing pad body 49 to plug the chamber 55 which connects the small bores 58 in the body 49. This chamber 55 is easiest to form by drilling and therefore has to be plugged.

As indicated in FIG. 4, a suitable air supply line 59 is connected to the barb fitting 42 so as to conduct a flow of compressed air to the bearing pad body 49 generally set at a constant pressure in a range up to 50 psig.

Referring to FIG. 4, the means for moving the bearing pad 19 also includes a means 60 for deflecting the cross bar 21 in the reduced portion 21″ relative to the support 18 in order to move the bearing pad 19 relative to the datum plane and saw blade 12. This means 60 includes a pair of blocks 61 each of which is mounted, for example, by bolts to the cross bar 21 in spaced apart parallel relation. In addition, an air cylinder 62 is disposed between the two blocks 61. As indicated, the a cylinder 62 has a housing 63 which is supported between the blocks 61 by engaging a piston rod 67 in a bored hole in one block and accepting a threaded screw 65 into a bored hole in the cylinder end stem 64. The threaded screw 65 is threaded into and extends from the outer block 61. A suitable air line 68 is connected to the interior of the housing 63 so that upon introduction of air to the housing 63, the housing 63 moves relative to the piston 66 and piston rod 67 so as to spread the blocks 61 apart. This, in turn, causes a downward deflection of the cross bar 21 as viewed in FIG. 4 and thus causes the bearing pad 19 to rotate towards the saw blade 12. Withdrawing air from the housing 63 of the air cylinder 62 causes a reverse motion so that the blocks 61 are brought closer together thereby returning the cross bar 21 upwardly toward the free position from which it started. This in turn, moves the bearing pad 19 away from the saw blade 12.

A suitable controller (not shown) is provided to effect the delivery of air to the air cylinder 62.

Referring to FIG. 3, wherein like reference characters indicate like parts as above, each sensor 20 is fixably mounted to the support 18 via a cross bar 69 which is secured as by a pair of bolts 70 to the support 18. In addition, the support bar 69 carries an arm 23′ at the free end in cantilevered fashion in a manner as described above for a bearing pad 19. A clamp 31′ also depends from the arm 23′ and has a bifurcated end portion 33′ for holding a sensor 20 therein. In contradistinction to a bearing pad 19, each sensor 20 is fixably mounted relative to the datum plane for the saw blade 12. Also, each sensor 20 while being located adjacent to a respective bearing pad 19 (see FIG. 1) is independently mounted of the bearing pad 19.

Referring to FIG. 5, each sensor 20 is of generally known construction. In this respect, each sensor 20 has a housing 71 fixably mounted in a bifurcated end portion 33′ of a clamp 31′ and a sensor 72 which is disposed within an extension 73 threaded onto the housing 71. An O-ring 74 is also provided between the extension 73 and the sensor 72 to provide a seal.

As indicated in FIG. 5, the sensor 72 is threadably mounted in the extension 73. Turning the screw 36 engaged with the reduced portion 34 through the flexible portion 35 in the bifurcated end portion 33' (FIG. 3) permits adjustment of a spacing or gap between the end of the sensor 72 and the saw blade 12. A suitable cable 74 extends from the sensor 72 so as to emit a signal corresponding to the distance between the saw blade 12 and the end of the sensor 72. This cable 74 extends to the controller (not shown) for controlling the air delivered to the air cylinder 62 (see FIG. 4) for controlling the position of the adjacent bearing pad 19.

As indicated in FIG. 2, the bearing pad 19 and the sensor 20 on the left-hand side of the ingot, as viewed, are mounted in slightly different fashion from the bearing pad 19 and sensor 20 described above. In this respect, the cross bar 21' for the bearing pad 19 is secured to the top of the support 18, for example, by a pair of bolts 75. Likewise, the cross bar 69' for the adjacent sensor 20 is mounted to the top of the support 18 via a pair of bolts 76. However, where appropriate, the pairs of bearing pads 19 and sensors 20 may be mounted in the same or similar fashion depending upon clearances and the like relative to the wheelhead assembly 11.

In use, for example, after a saw blade 12 has been mounted via the blade mount 13 on the wheelhead assembly 11, the datum plane for the saw blade 12 is effected. Next, the blade track control system is mounted on the main frame 10. In this respect, various components of the blade track control system may be mounted on the main frame 10 prior to mounting of the saw blade 12 or not. In any event, once the blade track control system is in place, the adjusting screws 36 of the respective clamps 31, 31' are adjusted so as to bring the respective bearing pads 19 and sensors 20 into the appropriate spacing relative to the saw blade 12. This establishes a "home" position for the respective bearing pads 19 wherein the bearing face of the bearing head is spaced from the datum plane a minimum distance of 0.001 inch. For example, in the case of the bearing pads, with the blade turning at operating speed, coolant ON, air pressure to the bearing pads at 30 psig, air pressure to the air cylinders at 50 psig, the blade deflection is set at up to 25 microns from the datum plane.

At the start of a wafer cutting cycle, the bearing pads 19 are deflected toward the blade 12 from the home positions by predetermined amounts such that the blade 12 is preloaded or prepositioned with a displacement of up to 25 microns from its free position, that is, from the given datum plane. The saw blade 12 thus takes up position in a cutting plane for cutting a wafer 16 from an ingot 15.

During cutting, the path of the blade 12 is maintained true to the cutting plane throughout the cut. In this regard, as the blade 12 cuts through the ingot 15 (see FIG. 4) any tendency to deviate from the true cutting plane will be sensed by a respective sensor 20 and an appropriate signal delivered to the controller (not shown) so as to change the air pressure in the respective air cylinder 62 and, thereby, effect a deflection of the respective cross bar 21 and, thus, movement of a respective bearing pad 19. If the blade tends to move or drift in a direction away from the ingot 15, the air pressure to the air cylinder 62 is reduced. Thereby, the bearing pad 19 moves away from the saw blade 12 putting less pressure on the blade. This allows the blade 12 to counter the tendency to drift away from the ingot 15. The reverse occurs should the blade 12 drift toward the ingot 15.

Due to the swiveling capability of the bearing head 40 of each bearing pad 19, the face of the bearing pad body 49 can be maintained in a true parallel relation to the saw blade 12 regardless of the position of the bearing pad 19 relative to the datum plane.

Further, the bearing pad bodies 49 of the respective bearing pads 19 are provided with a supply of air under constant pressure. Thus, a minimum amount (in the range of one half cubic foot of standard air per minute per pad) of compressed air can be used to maintain the cutting plane of the blade 12 with the total air consumption of the system being 1.5 SCFM (standard cubic feet per minute). In this respect, the bearing pads will always ride on a thin film of air without physically contacting the blade.

The resilient mounting of the bearing head 40 of each bearing pad 19 prevents excessive bearing pad pressure to be inadvertently applied to the blade in the range of two pounds maximum force. This avoids contact between the bearing pad body 49 and the blade 12 and also avoids damage to the blade 12 from excessive deflection of the blade 12.

The invention thus provides a blade track control system which can be readily retrofitted onto existing saw blade assemblies for example onto STC-200 model saws. Further, the invention provides a blade track control system which utilizes a minimum of compressed air and reduces any tendency of the air to blow away the liquid coolant film on a saw blade during a cutting operation. Thus, the invention also eliminates the need to add special restorative coolant to cool and lubricate a saw blade during cutting.

The invention further provides a relatively less massive structure to support a blade track control system on a saw blade assembly. For example, the various components of the control system such as the depending arms to the air bearing pads and clamps may be made of less rigid cross section and material such as aluminum or any other suitable material. Any steel structure in this regard may be made equally less rigid.

The construction and operation of the blade track control system is relatively simple and requires a minimum of precision adjustment and maintenance. Thus, downtime for maintenance and setup adjustments is kept to a minimum.

We claim:

1. A blade track control system for an ID saw blade, said system comprising a pair of pneumatic bearing pads disposed in spaced facing relation to an ID saw blade mounted on a given datum plane to provide an aerodynamic bearing surface film between each respective bearing pad and the saw blade during cutting of an ingot;

means connected to each said respective bearing pad to adjust the position of said respective bearing pad relative to said datum plane to deflect the ID saw blade from said datum plane into a cutting plane for cutting of a wafer there from; and a pair of sensors disposed in spaced facing relation to said blade for sensing a deviation of the blade from said cutting plane thereat during cutting, each sensor being disposed adjacent a respective bearing pad and connected to said means to deliver a signal thereto indicative of a deviation of the blade thereat from said cutting plane during cutting of the ingot to effect an adjustment of the position of said respective bearing pad relative to said datum plane while maintaining said bearing surface film between said respective bearing pad and the saw blade.

2. A system as set forth in claim 1 wherein said means includes a fixedly mounted support, a cross bar secured to and extending from said support and having one of said bearing pads mounted thereon in cantilevered manner, and means for deflecting said cross bar relative to said support to move said one bearing pad relative to the blade.

3. A system as set forth in claim 2 wherein each said bearing pad includes a holder and a bearing head mounted on said holder for pivoting thereon with two degrees of freedom relative to the saw blade.

4. A system as set forth in claim 3 which further includes means for resiliently mounting said bearing head on said holder for rectilinear motion relative to said holder and the saw blade.

5. A system as set forth in claim 3 wherein said bearing head has a plurality of outlets disposed in a circumferential array for blowing a plurality of jets of air against the saw blade.

6. A system as set forth in claim 3 wherein said bearing head has a bearing face spaced from said datum plane a minimum distance of from 0.001" when in a "home" position.

7. A system as set forth in claim 1 wherein each said bearing pad includes a holder and a bearing head mounted on said holder for pivoting thereon with two degrees of freedom relative to the saw blade.

8. A system as set forth in claim 7 which further includes means for resiliently mounting said bearing head on said holder for rectilinear motion relative to said holder and the saw blade.

9. A system as set forth in claim 7 wherein said bearing head has a bearing face spaced from said datum plane a minimum distance of 0.001 when in a "home" position.

10. In combination,
a frame;
a wheelhead assembly rotatably mounted on said frame, said assembly including a saw blade mounted on a given datum plane for cutting an ingot; and
a blade track control system including at least one pneumatic bearing pad disposed in spaced facing relation to said saw blade for blowing pressurized air onto said blade to provide an aerodynamic bearing surface film for bearing onto said blade during cutting of an ingot, at least one sensor adjacent said bearing pad for sensing and emitting a signal in response to deviation of said blade from said cutting plane; and
means for moving said bearing pad relative to said datum plane to move said saw blade from said datum plane into a cutting plane and for subsequently moving said bearing pad in response to said signal to maintain said blade in said cutting plane.

11. The combination as set forth in claim 10 wherein said sensor is fixedly mounted relative to said datum plane.

12. The combination as set forth in claim 10 wherein said means includes a cross bar secured to and extending from said support and having said bearing pad mounted thereon in cantilevered manner, and means for deflecting said cross bar relative to said support to move said bearing pad relative to said datum plane in response to said signal from said sensor.

13. The combination as set forth in claim 12 which further comprises an arm secured to and extending from one end of said cross bar, means for adjusting the position of said arm on said cross bar, and a clamp secured to and extending from said arm and having said bearing pad mounted at one end thereof.

14. The combination as set forth in claim 13 wherein said clamp includes a bifurcated end portion receiving said bearing pad therein;
a reduced portion extending from said end portion, a flexible portion extending from said end portion in parallel to said reduced portion; and
an adjustment screw threaded into and through said flexible portion into engagement with said reduced portion to effect deflection of said end portion relative to said datum plane.

15. The combination as set forth in claim 12 wherein said bearing pad includes a holder and a bearing head mounted on said holder for pivoting thereon with two degrees of freedom relative to the saw blade.

16. The combination as set forth in claim 15 which further includes means for resiliently mounting said bearing head on said holder for rectilinear motion relative to said holder and the saw blade.

17. In combination
a frame;
a wheelhead assembly rotatably mounted on said frame, said assembly including a saw blade mounted on a given datum plane for cutting an ingot;
a support mounted on said frame;
a pair of pneumatic bearing pads mounted on said support in spaced facing relation to said saw blade for blowing pressurized air onto said blade provide an aerodynamic bearing surface film for bearing onto said blade during cutting of an ingot;
a pair of sensors, each being mounted on said support in facing relation to said saw blade for sensing and emitting a signal in response to a deviation of said blade from said cutting plane; and
means between each respective sensor and a respective bearing pad for moving a respective bearing pad relative to said datum plane to move said saw blade from said datum plane into a cutting plane and for subsequently moving said bearing pad in response to said signal from a respective sensor to maintain said blade in said cutting plane.

18. The combination as set forth in claim 17 wherein each bearing pad blows pressurized air of constant pressure onto said blade.

19. The combination as set forth in claim 17 wherein each bearing pad is disposed on an opposite side of a diametric central plane of said saw blade and is movable independently of the other bearing pad.

20. The combination as set forth in claim 17 wherein each said bearing pad includes a holder and a bearing head mounted on said holder for pivoting thereon with two degrees of freedom relative to the saw blade.

21. The combination as set forth in claim 20 which further includes means for resiliently mounting said bearing head on said holder for rectilinear motion relative to said holder and the saw blade.

* * * * *